United States Patent [19]
Jones et al.

[11] Patent Number: 6,020,670
[45] Date of Patent: Feb. 1, 2000

[54] CONNECTOR SUPPORT BLOCK FOR LIMITING DEFLECTION OF A MAIN LEAD CONNECTOR IN AN ELECTRIC MACHINE

[75] Inventors: Steven William Jones, Delanson; Marcus Edward Harrington, Clifton Park; James F. Hopeck, Mechanicville; Patrick Brian Douglass, Amsterdam; Steven Lester Adams, Clifton Park; Klaus Sommerlatte, Guilderland; Kena Kimi Yokoyama, Latham, all of N.Y.; Apostolos Karafillis, Cambridge, Mass.

[73] Assignee: General Electric Co., Schenectady, N.Y.

[21] Appl. No.: 09/135,336

[22] Filed: Aug. 17, 1998

[51] Int. Cl.$^7$ ............................................. H02K 3/46
[52] U.S. Cl. ..................... 310/270; 310/71; 310/260; 310/270; 310/234
[58] Field of Search .................... 310/71, 260, 270, 310/261, 234; 29/596

[56] References Cited

U.S. PATENT DOCUMENTS

| | | | |
|---|---|---|---|
| 3,713,208 | 1/1973 | Doyle | 310/234 |
| 3,713,209 | 1/1973 | Biddison | 310/234 |
| 5,361,487 | 11/1994 | Luciani et al. | 310/71 |
| 5,382,855 | 1/1995 | Cousin | 310/71 |
| 5,535,503 | 7/1996 | Newman | 310/71 |

Primary Examiner—Nestor Ramirez
Assistant Examiner—Saeed Ghahramani
Attorney, Agent, or Firm—Nixon & Vanderhye

[57] ABSTRACT

A connector support block has a recess defined in part by an arcuate surface for limiting deflection of a main lead connector coupled between the main lead terminal and the innermost turn of end coils on a generator. The recess is spanned by a pin displaceable in elliptical openings in flanges defining the recess and about which pin the main lead connector makes a 180° bend. By limiting the deflection of the main lead connector, stresses introduced into the main lead connector at the 180° bend, a 90° bend and the joint between the main lead connector and innermost turn are reduced under cyclic loading whereby increased fatigue life of the main lead connector is provided.

14 Claims, 2 Drawing Sheets

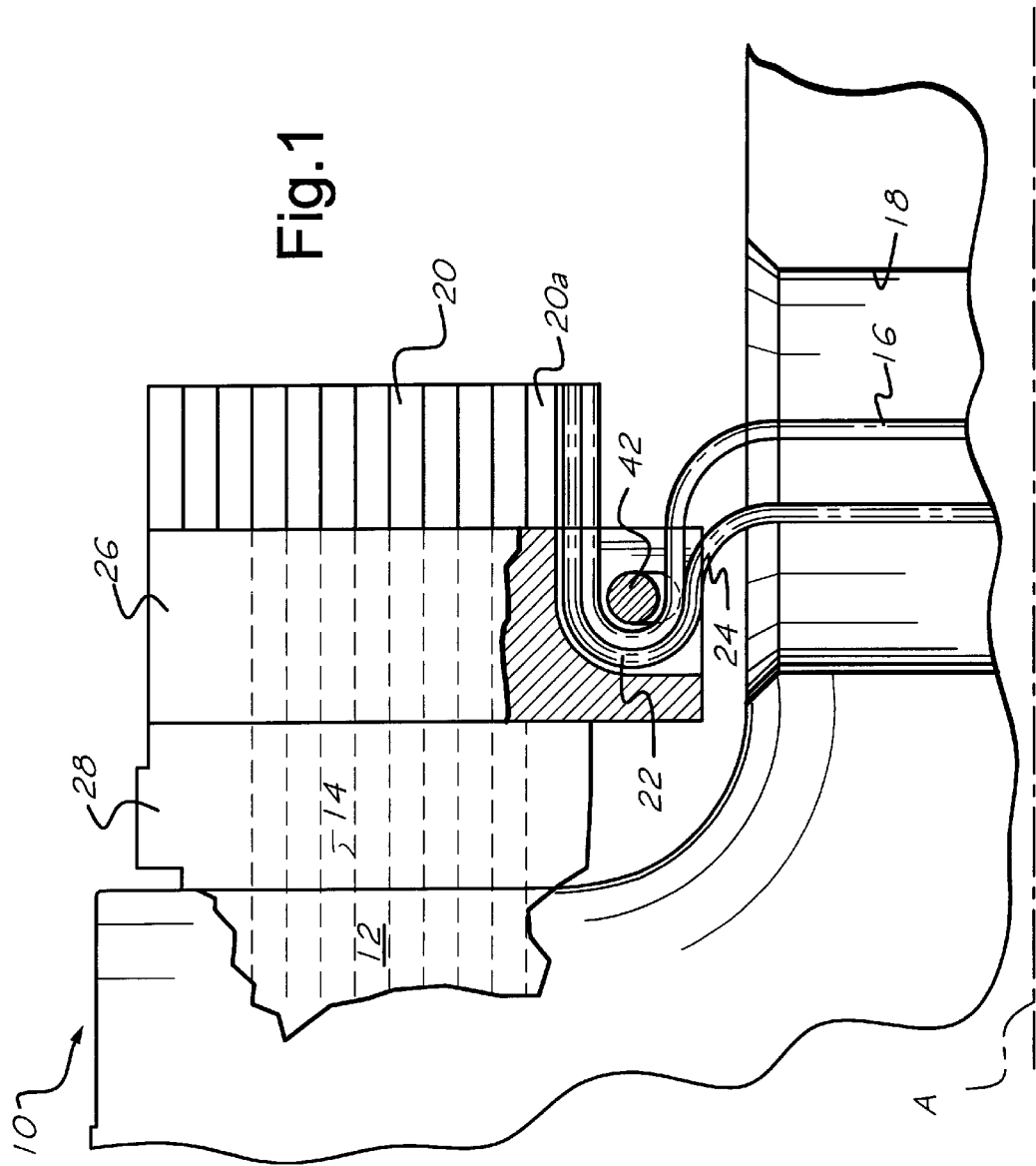

CONNECTOR SUPPORT BLOCK FOR LIMITING DEFLECTION OF A MAIN LEAD CONNECTOR IN AN ELECTRIC MACHINE

TECHNICAL FIELD

The present invention relates to electric machines, for example, a generator, and particularly relates to a connector support block carried by the rotor of the electric machine for restricting deflections of the main lead connector due to inertial pressure, thereby reducing stress on the connector and increasing its fatigue life.

BACKGROUND OF THE INVENTION

An electric machine, such as a generator, typically comprises a rotor mounted for rotation within a stator frame. The rotor has a plurality of axially extending, circumferentially spaced slots in which field coils or windings are disposed. The coils are generally wound in a spiral configuration in the slots throughout the length of the rotor and are interconnected pole-to-pole by field connectors. Additionally, the end coils or end windings are connected to main lead terminals by main lead connectors, the main lead terminals, in turn, being connected to an outside excitation source, for example, through collector rings or brushes.

In a typical connection between a main lead terminal and the radially innermost end coil or winding, there is provided a main lead connector which extends generally radially from adjacent the rotor axis and makes a 180° turn for connection with the innermost turn of the end winding. Particularly, the main lead connector extends radially outwardly, makes an approximately 90° bend to extend in an axial direction and then makes a 180° bend to extend in the opposite axial direction to underlie the innermost end winding to which it is connected, for example, by brazing. As will be appreciated, substantial inertial forces, i.e., centrifugal forces, are imposed on the windings and connectors at running speeds. These large forces can cause significant displacements of flexible conductors, e.g., the main lead connectors, as the speed increases from zero to synchronous speed, i.e., 3600 rpm, and back down to zero again during the start/stop cycles of the machine. The stresses associated with such displacements can lead to premature failure of the connectors, with a resultant long forced outage to replace the failed part.

More particularly, most current designs have no provisions for restricting the displacement of the main lead connectors. That is, there is no support for the main lead connectors at the substantial right-angle turn and 180° turn of the main lead connectors for connection to the field end coils. The centrifugal forces acting on the turns of the main lead connectors tend to displace the connectors radially outwardly against the stack, causing stress and fatigue failures. A particular failure location occurs at the joint between the end of the main lead connector and the innermost end coil. It has been found that the radial outer end of the main lead connector bends radially outwardly, relaxes and bends outwardly again in response to centrifugal forces. Over time, stress causes the joint to break. Another area of significant stress is at the 180° bend, as well as the right-angle bend. With multiple start/stop cycles, this stress can lead to cracks and actual breaking of the main lead connector. In certain designs, a flat-bottom block is positioned radially above the connector which has as a secondary function the positioning of the lead. However, the primary function of the flat-bottom block is to maintain the alignment of the coil stack. Accordingly, there has been a demonstrated need for a support block for limiting the deflection of the main lead connector to minimize stress and improve its fatigue life.

BRIEF SUMMARY OF THE INVENTION

In accordance with the present invention, there is provided a connector support block positioned on the rotor radially outwardly of the turns or bends of the main lead connector and oriented and having a surface for limiting deflection of the connector whereby stresses are minimized and the fatigue life of the connector can be increased. By limiting the deflections of the main lead connector, the connector is able to meet a specified number of cycles without limiting the flexibility necessary to accommodate normal thermal and centrifugal growth of the related components. Particularly, the connector support block includes a generally rectilinear body having a pocket or recess adjacent one end opening through front and end faces of the body. The bottom surface of the recess is arcuate. The body also includes a pair of flanges which straddle the recess and the arcuate surface. The recess lies in registration with and receives a portion of the U-turn of the connector to limit its deflection. The flanges also carry a pin which extends in a generally tangential direction. In this manner, the main lead connector extends, e.g., is threaded between the pin and the arcuate surface as it makes the 180° turn for connection to the innermost end coil. That is, the flexible copper main lead connector folds into the recess and then folds back upon itself over the pin between the pin and the arcuate surface and extends to underlie and connect with the innermost end coil. The block is disposed between the end coils and an axial face of the rotor and thus the radially inwardly facing arcuate surface serves to limit deflection.

It is a feature of the present invention that the pin is mounted for displacement in a general radial direction. In a preferred form of the present invention, generally radially extending elliptical openings are provided in the flanges straddling the arcuate surface whereby the pin can float between different radial positions. The radial displacement of the pin facilitates assembly of the main lead connector through the support block and its connection with the innermost end coil. Additionally, the floating pin controls the size of the radii that the main lead connector can assume at running speed and the changes to those radii throughout the speed range. Preferably, the support block is formed of an epoxy glass material.

In a preferred embodiment according to the present invention, there is provided in an electric machine subjected to multiple starts and stops and including field coils secured to a rotor of the machine rotatable about an axis and which field coils are subjected to inertial forces during operation of the machine, a connector support block for a main lead connector connected to one of the field coils, comprising a connector support block body having a recess in part defined by an arcuate surface for receiving at least part of an arcuate bend in the main lead connector, the arcuate surface being disposed radially outwardly of the bend and a pair of flanges in part defining the recess and lying on opposite sides thereof and the arcuate surface, whereby deflections of the main lead connector responsive to the inertial forces are limited by the arcuate surface.

In a further preferred embodiment according to the present invention, there is provided in an electric machine subjected to multiple starts and stops and including field coils secured to a rotor of the machine rotatable about an axis and which field coils are subjected to inertial forces during operation of the machine, a connector support block for a main lead connector connected to one of the field coils, comprising a connector support block body having a surface radially outwardly of and affording a radial stop for at least part of an arcuate bend in the main lead connector, a pair of flanges on opposite sides of the stop, for straddling the arcuate bend part of the main lead connector, whereby deflections of the main lead connector responsive to the inertial forces are limited by the stop.

Accordingly, it is a primary object of the present invention to provide in an electric machine having end coils and a main lead connector coupling the end coils to a main lead terminal a support block for limiting the deflection of the main lead connector to minimize stress and improve fatigue life of the main lead connector.

BRIEF DESCRIPTION OF THE DRAWINGS

FIG. 1 is a fragmentary cross-sectional view in a plane passing through the axis of a rotor of an electric machine illustrating the end coils and main lead connections with the connector support block of the present invention installed;

DETAILED DESCRIPTION OF THE INVENTION

Figure 3:
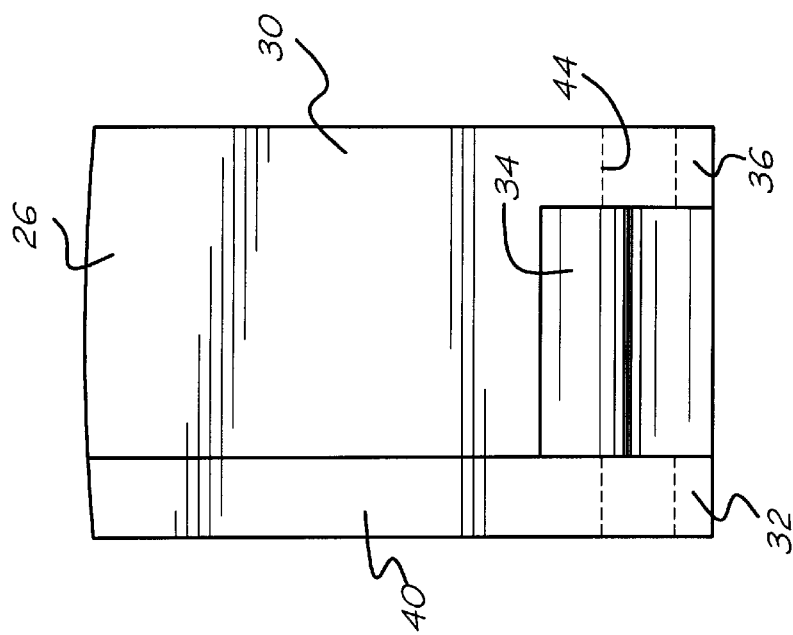
FIG. 3 is a front elevational view of the support block.

Referring to FIG. 1, there is illustrated a portion of an electric machine, for example, a generator, generally designated 10, having a rotor 12, with rotor field windings or coils, only several of which are illustrated and designated by the dashed lines 14. As well known, the coils 14 extend in radial opening, axially extending slots in the rotor. Typically, the coils 14 are stacked one on top of the other and extend axially along one slot for return in an adjacent slot whereby a continuous spiral loop is formed by the windings in adjacent slots. The windings of adjacent slots are coupled to similar windings of circumferentially adjacent slots by field connector assemblies and ultimately the interconnected field coils are coupled to a pair of main lead connectors 16. Connectors 16 extend radially inwardly through openings 18 toward a central portion of the rotor for connection outside the rotor to an excitation source, for example, collector rings or brushes. It will be appreciated that the rotor 12 rotates about an axis of rotation A such that inertial forces such as centrifugal forces tend to thrust the field coils 14 radially outwardly, for example, against wedges in the rotor slots or a retaining ring, not shown, about the end coils 20 forming part of the field coils 14. These inertial forces from the rotation of the rotor, as well as from frequent start/stop cycles of the electric machine, produce substantial displacements, for example, in the main lead connectors 16, with resultant stresses associated with such displacements. The stresses can cause premature failure of the connectors.

As illustrated in FIG. 1, the innermost end turn 20a of the field coils 20 is electrically and mechanically connected, for example, by brazing, to the main lead connector 16. It will be appreciated that the main lead connectors are typically formed of flat strips of copper laminated to one another. Thus, the connector 16 extends in an axial direction to facilitate a flat brazed connection between the innermost turn 20a. From its connection with end turn 20a, the main lead connector 16 makes substantially a U-turn or 180° bend and then makes a reverse, generally right angular, bend to extend in a radially inward direction for connection with a main lead terminal, not shown. The 180° bend is designated 22, while the right angular bend is designated 24. It will be appreciated that the inertial forces, i.e., centrifugal forces acting on the main bend 22 of the main lead connector 16, tend to deflect the lead connector 16 in a radial outward direction, stressing the joint between the connector 16 and the innermost turn 20a. The joint under this cyclic loading fatigues and such stress can cause a break in the joint. Additionally, the continuous unrestrained flexing of the 180° bend can crimp and break the main lead connector 16 at such bend. A further area where stresses occur which can lead to a shortened life cycle is the right angular bend 24. Cyclic stresses at this location can break the connector over time. In the illustrated form, the main lead connector extends from the innermost turn 20a around the two bends and separates to join the main lead terminal, not shown, on opposite sides of the ladder. The main lead connectors 16 need not be spaced one from the other and preferably lie in contact with one another between the innermost turn 20a and the main lead terminal, not shown.

Figure 2:
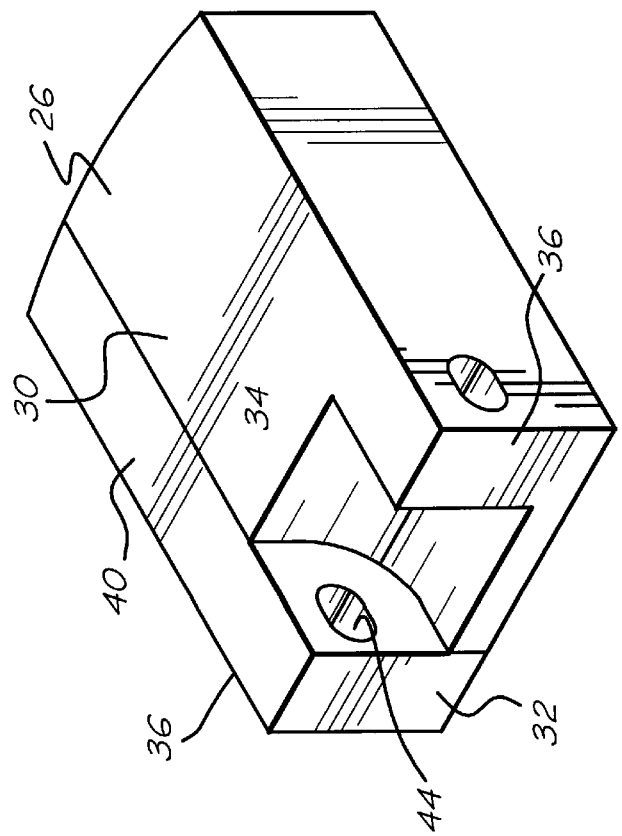
FIG. 2 is a perspective view of the connector support block.

In order to increase the fatigue life of the main lead connector 16 and in accordance with the present invention, there is provided a connector support block 26. The block 26 is suitably secured to the rotor shaft, for example, by a coil support block 28. Referring to FIGS. 2 and 3, the support block 26 comprises a generally rectilinear body 27 having a front face 30 and an end face 32. A recess or pocket 33 opens through the front face 30 and end face 32 adjacent one end of the block 26. The recess is defined in part by an arcuate recessed surface 34 and a pair of flanges 36 which straddle the recess and arcuate surface 34. The recess has a width between flanges 36 sufficient to accommodate the width of the main lead connectors 16. The support block 26 may be formed integrally of epoxy glass and may be formed unitarily or of a number of pieces. For example, the support block body 27 containing the arcuate surface 34 and one of the flanges 36 may comprise one piece, with the other flange 36 forming part of a rectilinear plate 40 secured to a side of the piece. Other ways of forming the support block 26 will occur to those of skill in this art.

Referring back to FIG. 1, it will be seen that the connector support block 26 is disposed behind the end coils 20 with its recessed end radially inwardly overlying the radially outermost 90° portion of the 180° U-turn of the main lead connector 16. That is, the U-turn or bend 22 in the main lead connector 16 is received within the recess with at least a 90° portion of the bend in registration with the arcuate surface. In this manner, the radial outward deflections of the connector 16 are limited to relatively small displacements by the arcuate surface such that the life of the connectors 16 can be extended to meet the specified number of cycles without limiting the flexibility necessary to accommodate the normal thermal centrifugal growth of related components.

Additionally, a pin 42 is disposed in recess 33. The pin extends between the opposite flanges 36 and is housed in openings 44 which are generally elliptical in shape. The long axes of the elliptical-shaped openings 44 extend generally radially such that, when the block 26 is installed on the rotor, the pin 42 is movable in a radial direction, limited only by the ends of the elliptical slots 44. Thus, the pin, along with the arcuate surface, controls the size of the radii that the connector can assume at running speed and the changes to those radii throughout the range of speeds. The radial displacement of the pin also facilitates the assembly of the main lead connector to the innermost turn 20a by facilitating the threading of the bent portions of the main lead connector between the pin 42 and the arcuate surface 34 of the connector support block 26. The location, i.e., the radial height of the block is designed to minimize the step between the bottom or innermost turn 20*a* of the end coil and the bottom of the block which reduces deflection and eliminates the shearing load on the main lead connector.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an electric machine subjected to multiple starts and stops and including field coils secured to a rotor of the machine rotatable about an axis and which field coils are subjected to inertial forces during operation of the machine, a connector support block for a main lead connector connected to one of the field coils, comprising:

a connector support block body having a recess in part defined by an arcuate surface for receiving at least part of an arcuate bend in the main lead connector, said arcuate surface being disposed radially outwardly of the bend; and a pair of flanges in part defining said recess and lying on opposite sides thereof and said arcuate surface, whereby deflections of the main lead connector responsive to the inertial forces are limited by the arcuate surface.

2. A connector support block according to claim 1 wherein said arcuate surface is generally complementary in shape to the outer radius of said arcuate bend part of the main lead connector.

3. A connector support block according to claim 1 including a pin extending in said recess and between said flanges for engaging an inner radiussed portion of the main lead connector at said arcuate bend part thereof.

4. A connector support block according to claim 3 wherein said flanges enable displacement of said pin in radial directions, said main connector lead extending between said pin and said arcuate surface.

5. A connector support block according to claim 4 wherein said flanges have openings elongated in a radial direction for receiving opposite ends of said pin enabling displacement of said pin in a radial direction.

6. A connector support block according to claim 4 wherein said pin extends in a generally tangential direction relative to said rotor.

7. A connector support block according to claim 1 wherein said body is formed of an epoxy glass material.

8. A connector support block according to claim 1 wherein said body is generally rectilinear with said arcuate surface opening through an axial front face and an end face thereof.

9. In an electric machine subjected to multiple starts and stops and including field coils secured to a rotor of the machine rotatable about an axis and which field coils are subjected to inertial forces during operation of the machine, a connector support block for a main lead connector connected to one of the field coils, comprising:

a connector support block body having a surface radially outwardly of and affording a radial stop for at least part of an arcuate bend in the main lead connector;

a pair of flanges on opposite sides of said stop, for straddling said arcuate bend part of the main lead connector, whereby deflections of the main lead connector responsive to the inertial forces are limited by said stop.

10. A connector support block according to claim 9 wherein said stop surface is generally complementary in shape to the outer radius of said bend part of the main lead connector.

11. A connector support block according to claim 9 including a pin overlying said stop surface for engaging an inner radiussed portion of the main lead connector at said arcuate bend part thereof.

12. A connector support block according to claim 11 wherein said pin is mounted to said body for movement in radial directions, said main connector lead extending between said pin and said stop surface.

13. A connector support block according to claim 12 wherein said pin extends in a generally tangential direction relative to said rotor.

14. A connector support block according to claim 9 wherein said body is formed of an epoxy glass material.

\* \* \* \* \*